United States Patent
Deshpande et al.

(10) Patent No.: US 9,329,903 B2
(45) Date of Patent: May 3, 2016

(54) SYSTEM AND METHOD FOR INTERNET BASED SERVICE NOTIFICATION

(75) Inventors: Nikhil N. Deshpande, Maharashtra (IN); Kaushik M. Purohit, Gujarat (IN)

(73) Assignee: Emerson Electric Co., St. Louis, MO (US)

( * ) Notice: Subject to any disclaimer, the term of this patent is extended or adjusted under 35 U.S.C. 154(b) by 341 days.

(21) Appl. No.: 13/106,060

(22) Filed: May 12, 2011

(65) Prior Publication Data

US 2011/0282937 A1    Nov. 17, 2011

(30) Foreign Application Priority Data

May 12, 2010  (IN) .......................... 1493/MUM/2010

(51) Int. Cl.
| | | |
|---|---|---|
| *G06F 9/50* | (2006.01) | |
| *G06Q 10/06* | (2012.01) | |
| *G06Q 50/10* | (2012.01) | |
| *F24F 11/00* | (2006.01) | |

(52) U.S. Cl.
CPC .............. G06F 9/5055 (2013.01); G06Q 10/06 (2013.01); G06Q 50/10 (2013.01); *F24F 2011/0071* (2013.01)

(58) Field of Classification Search
CPC .. F24F 2011/0071; G06Q 10/06; G06Q 50/10
USPC .................. 709/203, 206, 276; 370/200, 412, 370/908–916; 705/8, 9, 7.13, 7.14, 7.21; 700/276
See application file for complete search history.

(56) References Cited

U.S. PATENT DOCUMENTS

| | | | | |
|---|---|---|---|---|
| 6,116,512 A | * | 9/2000 | Dushane ................. | F24D 19/10 165/238 |
| 6,608,560 B2 | | 8/2003 | Abrams .................... | 340/539.14 |
| 6,619,055 B1 | * | 9/2003 | Addy ..................... | F24F 11/006 236/46 R |
| 7,277,717 B1 | * | 10/2007 | Hart et al. ...................... | 455/466 |
| RE40,437 E | * | 7/2008 | Rosen .......................... | 700/277 |
| 7,451,606 B2 | * | 11/2008 | Harrod ................ | F24F 11/0086 62/125 |
| 8,180,661 B2 | * | 5/2012 | Thielges ................ | G06Q 10/06 705/7.13 |
| 8,321,232 B2 | * | 11/2012 | Sunday et al. ................ | 705/1.1 |
| 8,463,636 B2 | * | 6/2013 | Ahsan et al. ................. | 705/7.14 |
| 2002/0180590 A1 | * | 12/2002 | Abrams .................... | 340/286.06 |

(Continued)

OTHER PUBLICATIONS

Bella Solutions Service Management Software—Take a Tour video, 2008 http://www.bellasolutions.com/take_a_tour/bella_software.htm or http://www.youtube.com/watch?v=3Lq3C5ezZFE.*

*Primary Examiner* — Oleg Survillo
*Assistant Examiner* — Linh T Nguyen
(74) *Attorney, Agent, or Firm* — Harness, Dickey & Pierce, P.L.C.

(57) ABSTRACT

The present invention provides an Internet based detailed service notification system to inform the contractor of a customer in need of HVAC servicing. The thermostat has Internet connectivity provided to it. Whenever the customers need servicing or repair of their HVAC devices, they have a special menu/interface at their disposal in their thermostat which assists the customer's service request to be registered on the thermostat company's web server. The company's web server having all the details of the thermostat owner, then automatically forwards these details to the preferred contractor through SMS, through email or an automatically generated call. The details include the address details, phone numbers, type of service needed e.g. servicing, repairing, new device installation, replacement and the like.

18 Claims, 7 Drawing Sheets

(56) References Cited

U.S. PATENT DOCUMENTS

| | | | |
|---|---|---|---|
| 2003/0195640 A1* | 10/2003 | Krocker | G05B 15/02 700/26 |
| 2005/0033727 A1* | 2/2005 | Abrams | 707/1 |
| 2006/0102731 A1* | 5/2006 | Mueller et al. | 236/51 |
| 2006/0283965 A1* | 12/2006 | Mueller et al. | 236/51 |
| 2008/0120446 A1* | 5/2008 | Butler et al. | 710/63 |
| 2008/0167935 A1* | 7/2008 | Lopez | 705/9 |
| 2009/0045263 A1* | 2/2009 | Mueller et al. | 236/51 |
| 2009/0057424 A1* | 3/2009 | Sullivan | F24F 11/0009 236/51 |
| 2009/0057427 A1* | 3/2009 | Geadelmann | G05B 15/02 236/51 |
| 2009/0140056 A1* | 6/2009 | Leen | F24F 11/0086 236/49.3 |
| 2009/0216552 A1* | 8/2009 | Watrous | 705/1 |
| 2010/0206039 A1* | 8/2010 | Kates | G08B 21/0236 73/1.01 |

\* cited by examiner

SYSTEM AND METHOD FOR INTERNET BASED SERVICE NOTIFICATION

CROSS-REFERENCE TO RELATED APPLICATIONS

This application claims the benefit and priority of Indian Patent Application No. 1493/MUM/2010, filed May 12, 2010. The entire disclosure(s) of the above application is incorporated herein by reference.

FIELD

The present disclosure relates to the field of servicing of electrical devices.

BACKGROUND

This section provides background information related to the present disclosure which is not necessarily prior art.

After sales service contribute substantially to the profit margins of sales companies. With the advent of IT and global competitiveness, prompt and efficient after sales support has received enormous amount of impetus. Companies are constantly trying to lure prospective customers and maintain their existing pool of customers through the incentive of cheap, lucrative and efficient after sales support.

Any post-sales customer will prefer, service with minimum hassle. May it be a device replacement or repairing, the end customer will prefer to avoid technicalities of the service that he/she requires. Rather than having to deal with service personnel over the phone, it would be convenient if the customer has an automatic system which will raise his/her query, conveying all the details to the right and reliable contractor. Moreover, in this fast world, everyone wants their work to be done by a click or a press of a key. People are ready to pay more, but expect quality services. Especially when the issue is of immediate attention, they want the contractors to service them based on their urgent needs.

There have been attempts in the prior art to overcome the aforementioned problems and provide a convenient way to service/repair/replace their electrical devices. Particularly, U.S. Pat. No. 6,608,560 discloses a device and method for providing HVAC service assistance. This patent states that there can be a device in the HVAC network which assists users in troubleshooting the HVAC devices by audio and/or visual display. The patent states that the stated device may give a call for service to contractor if the user depresses an assistance button by any communication network like telephone or computer network. The contractor information can be loaded into the device at the time of service or when buying the device. However, the thermostat directly communicates with the contractor to request a servicing call, and does not have the facility to store the Customer's contact address and contact number, the configuration of customer's HVAC network, the severity of the service request, e.g. Trivial or Urgent, and the type of request, e.g. Servicing, Repairing, Regular check, new device installation or Device replacement and the like.

SUMMARY

This section provides a general summary of the disclosure, and is not a comprehensive disclosure of its full scope or all of its features.

The present invention provides an Internet based system for notifying service requests to predetermined group of service contractors from a predetermined group of device users, each user having at least one device in need of servicing from the contractor, the system comprising the following components:

i. a thermostat unit having a unique identification number linked to at least one of devices at a user end;
ii. a user interface co-operating with the thermostat unit for receiving service request from a user from pre-determined group of users;
iii. processing means adapted to receive and process the service request and stamp the service request with the unique identification number to generate a unique service request number;
iv. transmitting means adapted to receive and transmit the service request along with the unique service request number over the Internet; and
v. a web-based server comprising:
   a. look up table having correspondence between the unique identification number of thermostat units and contractor's address;
   b. receiving means adapted to receive the transmitted service request;
   c. extraction means adapted to extract the unique identification number from the transmitted service request;
   d. identifying means for identifying contractor's address from entries in the look up table; and
   e. notification means adapted to notify the service request and unique identification number to said identified contractor.

Preferably, the thermostat unit comprises the user interface, the processing means, the transmitting means and an interface to link with at least one of the devices.

Typically, the user interface is pre-loaded with a service request menu to enable users to select the desired service and raise the service request.

Additionally, the user interface includes at least one interface selected from the group of interfaces consisting of button, scroll, touch screen, switch and keypad.

Further, the interface is adapted to display the status of said service request.

Furthermore, the user interface is adapted to close a service request.

Typically, the service request includes at least one service selected from the group of services consisting of repair, regular check up, new device installation and device replacement.

Preferably, the service request is assigned urgency.

Typically, the notification means notifies the identified contractor the service request through means selected from the group consisting of SMS, email, automatically generated call, VoIP and FAX.

In accordance with the present invention, there is provided a method for Internet based service notification system, the method comprising the following steps:

i. compiling a list of contractors for servicing HVAC devices;
ii. generation of service request by the user;
iii. processing the service request by stamping a unique identification number;
iv. transmitting said service request over the Internet to a web-based server;
v. extracting the transmitted service request by web-based server;
vi. identifying contractor's address from the entries in the web-server;
vii. addressing service request and unique identification number to identified contractor; and
viii. closure of the service request by the user after completion of service request.

In accordance with the present invention, the step of generating service request includes a step of choosing at least one service selected from the group of services consisting of repair, regular check up, new device installation and device replacement.

Typically, the step of generating service request includes a step of assigning urgency to a service request.

The step of generating service request may include a step of displaying the status of service request on said user interface.

Preferably, the step of identification of contractor includes a step of identifying the contractor adapted to service a device in need of service located proximal to the user.

Further areas of applicability will become apparent from the description provided herein. The description and specific examples in this summary are intended for purposes of illustration only and are not intended to limit the scope of the present disclosure.

In accordance with the present invention the process of servicing is a closed loop process.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Servicing, repairing and replacement of parts of electrical and electronic devices/HVAC devices cause a lot of worry for customers, as arranging for these services requires them to contact and constantly follow up with the contractors. Even if the contractors visit the customers based on the complaint, they take at least two to three days to resolve the complaint. Typically, the first day is spent in inspection of the subject HVAC device and understanding the nature of the complaint and another two to three days are spent on procuring the parts to be replaced and actually servicing the HVAC device.

The present disclosure provides an Internet based detailed service notification system to overcome the inconvenience and unnecessary delays caused in contacting contractors for servicing of equipment.

In accordance with the present disclosure, the Internet based detailed service notification system provides an advanced thermostat unit, which will be fitted to each one of the HVAC devices. This thermostat unit is an intelligent unit which will be assigned a unique thermostat identification number and will not only regulate the temperature, air flow, humidification, and or any parameter related to user comfort in the HVAC device but also communicate the users request for servicing/replacing/repairing that HVAC device. The thermostat unit is provided with a display and an Internet connection for communicating the user service requests to a web server. The thermostat is pre-programmed with a drill down service request menu for a particular HVAC device to which the thermostat unit is connected. The first level of the menu enables the user to select the type of service i.e. servicing, repairing, regular check, new device installation and replacement. Once the user selects the first level option, then sub-options for the selection are presented. After selection of the sub-option, the user is required to select the urgency of the service and the time window within which they want the contractor to come for performing the request service. Thus, from the comfort of their homes, users can select the service they intend to avail without the need for following up with a contractor.

In accordance with the present disclosure, the service request menu enables the customers to select and register their request on the web server. The web server is a server hosted by the company manufacturing the thermostat unit for a particular HVAC device. Thus, the thermostat manufacturer company can directly handle the post sales servicing requests for their devices, opening a new business avenue for the thermostat manufacturer company. The thermostat manufacturer company secures and maintains a list of contractors who can be approached for providing servicing. The background and quality check is performed by the company to ensure that the customers get quality servicing with minimum delays. The thermostat company also maintains details associated with customers who have purchased the HVAC devices fitted with the thermostat unit, along with the thermostat unique identification number. Along with the customer details, a customer log is maintained. The log notifies the company when the servicing/replacement for certain parts of the HVAC device is due, so the company can proactively follow up with the customers and perform the necessary servicing. In addition, the log tracks the servicing history of the customer. To improve customer satisfaction, the present disclosure provides customers with a membership/subscription facility. The membership details are considered while assigning a particular contractor for performing the servicing.

The web server stores all the details of the thermostat unit based on the HVAC device owner, then automatically forwards these details to a preferred contractor through an SMS, email, automatically generated call, VoIP, Facsimile or the like. The details include the customer address details, phone numbers, type of service needed at the customer's location, for instance servicing, repairing, new device installation, replacement and the like, and the indication of the severity of the service request, for instance, urgent or non-urgent. Based on the severity, the contractor can decide which customer to contact and service first. By this method, the customers get service based on the type of service and severity of their problem. Hence, customers who need immediate attention do not have to wait for their turn. The need to remember the contractor's phone numbers and details for the user of the thermostat unit is eliminated.

In accordance with the present disclosure, the service provider maintaining the web server keeps track of good, preferred contractors in each particular area. This creates a relation between the customer and the service provider maintaining the web server. As the user interface is a part of the thermostat unit and is easily accessible, it increases the opportunity for possible repeat business for the service provider and the preferred contractors.

In accordance with the present disclosure, the customer can close the generated service request once the equipment is serviced by the contactor. The closure of the request is done using the pre-programmed service request menu on the user interface.

The present disclosure will now be described using the accompanying drawings, without limiting the scope of the invention.

Figure 1:
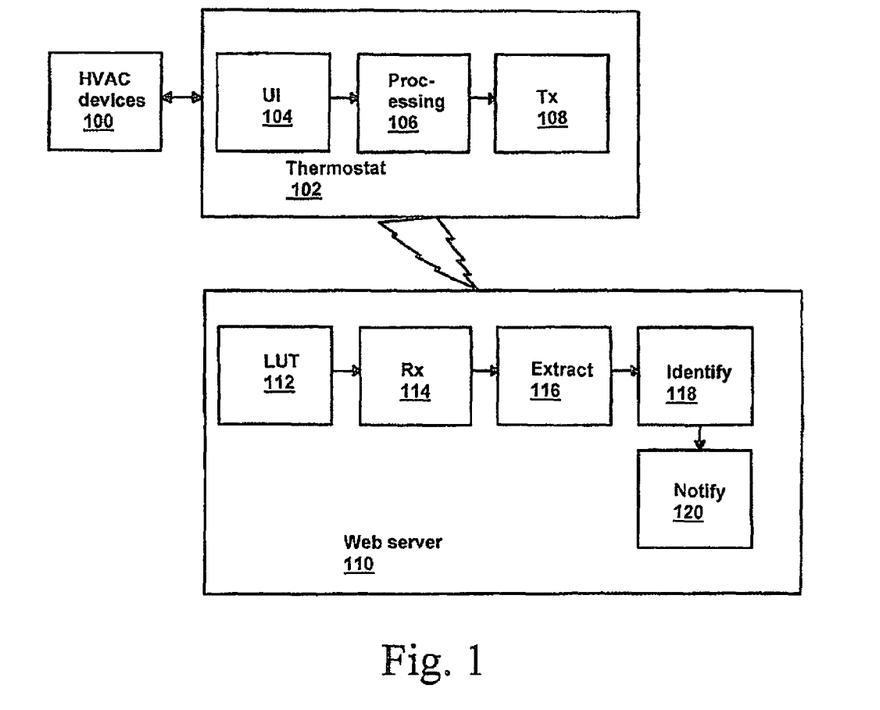
FIG. 1 illustrates the architecture of Internet based detailed service notification system, in accordance with the present invention.

Referring to FIG. 1 of the accompanying drawings, an overview of the system 10 is shown in accordance with the present disclosure. The collection of various HVAC devices is represented generally by reference numeral 100. The HVAC devices each communicate with a thermostat unit 102 of the present disclosure. The thermostat unit 102 comprises a user interface 104, processing means 106 and transmitting means 108. The user interface 104 is adapted to communicate with the HVAC device 100 and present the service request menu for the user. The user, on accessing the service request menu of the user interface 104 of the thermostat unit 102, can select the kind of service they wish to avail, i.e. servicing/repair/replacement. The service request menu is a text based menu and/or graphical menu which enables the user to select the desired service using the user interface including a button, scroll, touch screen, switch and keypad.

The service request menu can be drilled down further to another level or service request menu to pin point/specify the exact nature of the problem. The formulated service request is sent to the processing means 106, which accepts the service request input by the users and processes this information, generates and assigns a unique identification number for the service request along with the identification number of the thermostat unit 102, and forms a packet which is then sent to a web server 110 via the transmitting means 108 over the Internet. The transmitting means 108 forwards the service request packet to a router which routes it to the web server 110.

The web based server 110 further comprises:
a look-up table 112 having a unique identification number of a thermostat unit corresponding with a contractor's address;
receiving means 114 to receive transmitted service request packets from the thermostat unit 102;
extraction means 116 to extract the information from the packets;
identifying means 118 to identify the nature of the service request and, by using the look-up table 112, to identify a contractor to service the request; and
notification means 120 to notify the identified contractor of the service request using mediums including SMS, email, automatically generated call, VoIP and Facsimile.

In accordance with the present disclosure, the extraction means 116 is adapted to extract the unique identification number included from the transmission request sent by the thermostat in need of the servicing. The look-up table 112 has a pre-programmed and constantly updated repository of various contractors and the customers. The choice of the contractor for a specific service request from a specific thermostat unit for a specific device is made though this look-up table 112 using identifying means 118. The contractor is identified using identifying means 118 primarily on the basis of the contractor's technical competence to service the raised request and the contractor's proximity to the user's location. Once a contractor is identified using the identification means 118, the notification means 120 transmits the unique service request number and the service request to the identified contractor.

In accordance with the present disclosure, for every thermostat unit 102 sold, either by the company or a contractor, the following details are uploaded on the seller company's web server's databases corresponding to each one thermostat unit 102;
customer's address;
customer's phone number;
details of installed HVAC devices at the customer's location and the like.

In accordance with the present disclosure, during the installation of the thermostat unit 102 at the customer's place, an Internet connection is provided to the thermostat unit 102. The Internet connection can be through wired or wireless technology. The thermostat unit 102 then connects to the remote web server through the Internet. For identification of the thermostat unit by the company's web server 110, a unique identification number is stored in the thermostat's non-volatile memory.

In accordance with the present disclosure, the HVAC devices 100 are connected to the thermostat unit through the HVAC interface, and the service request menu provided through the user interface 104 with the thermostat unit 102. The user interface 104 can just be a button, a touch screen display, a switch, a key on a keypad or a combination of them along with a display which makes the process of service request an interactive one.

In accordance with the present disclosure, using the user interface 104 the user is able to select the type of service he/she needs for the installation at the user's location. The user is allowed to select the severity of the service. Preferably, the particular severity is mandatory and not optional, as this option will help the contractor identify which user to service depending on the severity of the service request. When the user presses the final key to send the request, the thermostat, already connected to the web server 110, places a service request and makes an entry in the list of customers who need attention/service. The web server on reception of this request then notifies the same to the preferred contractor of that particular area. The request can be forwarded via email, SMS, any automated phone call, fax, VoIP and the like.

As the contractor receives all the details of the customer's installed unit (for example, type of device installed, nature of problem, urgency of the service request), the contractor is better able to serve the customer.

Figure 2:
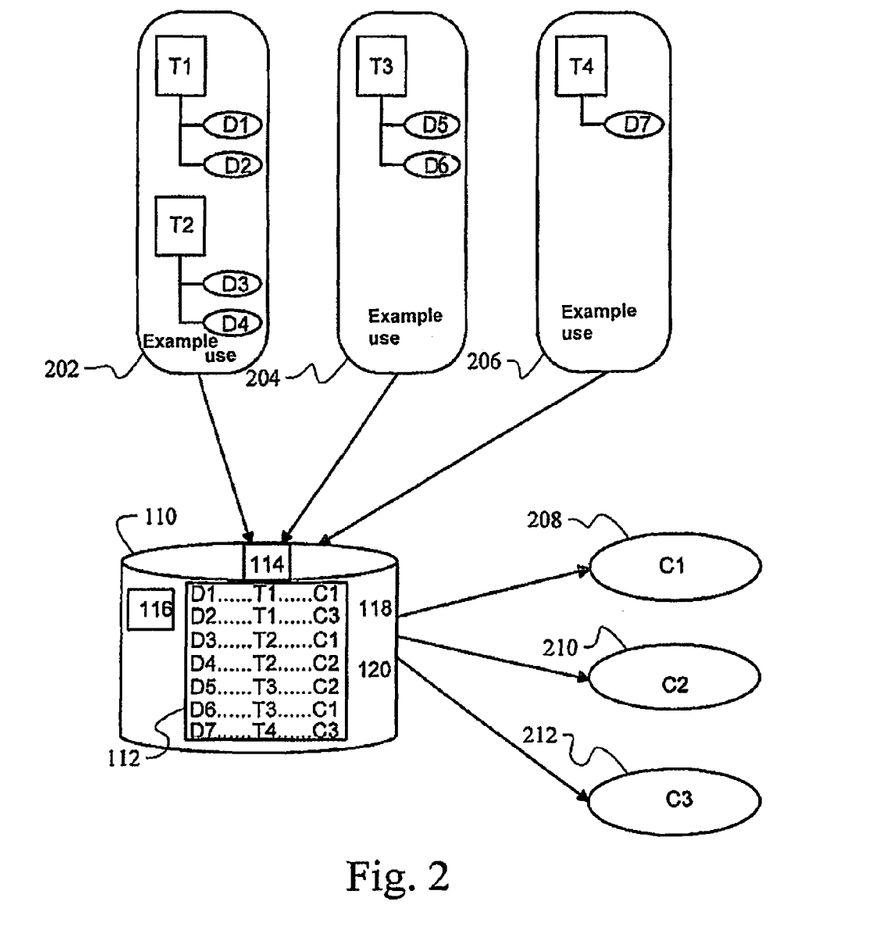
FIG. 2 illustrates schematics of the look-up table used in the choosing the contractor to service a device in need of servicing, in accordance with the present invention.

Referring to the accompanying drawings, FIG. 2 depicts the operational overview of various embodiments of the present disclosure.

The present disclosure provides a servicing request that is sent to a preferred contractor, such that the chosen contractor is competent to service the device requiring servicing or is competent to handle the need of the service request. For example, if the servicing request is to service a "Humidifier" unit then the selection logic for the contractor will be chosen on the basis of a contractor who is located near the location of the user and who is competent to service a "Humidifier" unit. The selection logic can also be based on any other relevant technical/business related parameters.

In accordance with the present disclosure, the selection logic is pre-programmed into the web server's look-up table 112. The illustration of the selection process is described with reference to the accompanying FIG. 2. The look-up table 112 depicts the correspondence between the details of the service, the thermostat unit 102 and the contractors located nearest to the thermostat unit 102.

Referring to FIG. 2, numeral 202 generally represents a typical case where the user houses two thermostats T1 and T2 each linked to devices D1 and D2 and D3 and D4 respectively. The user depicted in 202 can also be used to represent a user with more than two thermostat units 102. The user depicted in 204 represents a typical case where one thermostat unit 102 is connected to more than one device D5 and D6. Numeral 206 represents a typical case where a user has installed only one thermostat T4 linked to only one device D7.

The intent behind the above mentioned representation is to represent that the present disclosure provides all possible permutations and combinations that are feasible with the number of thermostats and devices linked to these thermostats.

In accordance with the present disclosure, whenever the user initiates a service request through the user interface 104, a unique service request number is generated with the request. The unique service request consists of the device number in need of servicing, as well as the thermostat unique identification number. This assists the web server 110 to identify the device and the corresponding thermostat, without any ambiguity so the web server can choose a competent contractor from the look-up table 112.

Once a contractor is identified based on competence and proximity, there is an additional business sense built in the selection logic of the contractor. The selection criteria also accounts for the class of the user, where class of the user indicates that the user falls under a category of special service. For example, if the user has been an old customer and a regular one, then the user can be graded as a premium user. Thus, if a premium subscription level customer requests service, then further filtering criteria is employed for a user for choosing a service personnel depending on the need of that particular client i.e. English-speaking, polite, technically competent with hazard training, and the like.

For example, it is not compulsory that a given contractor is fixed for a specific user. The contractors are chosen intelligently depending on the servicing need of a particular device. Hence, as seen from the look-up table 112 the contractor for a combination of thermostat T1 and linked device D1, contractor C1 (208) is chosen to forward the service request. Again, referring to second row of the look-up table 112, for the same thermostat T1 but linked device D2, a different contractor C3 (212) is chosen for servicing. For thermostat T3, contractor C2 (210) may be chosen, as shown in the fifth row of look-up table 112 in FIG. 2.

Referring to accompanying drawings, FIGS. 3-8 depict the method of registering the request (which is 'New device installation' in the example) and closing the same.

Figure 9:
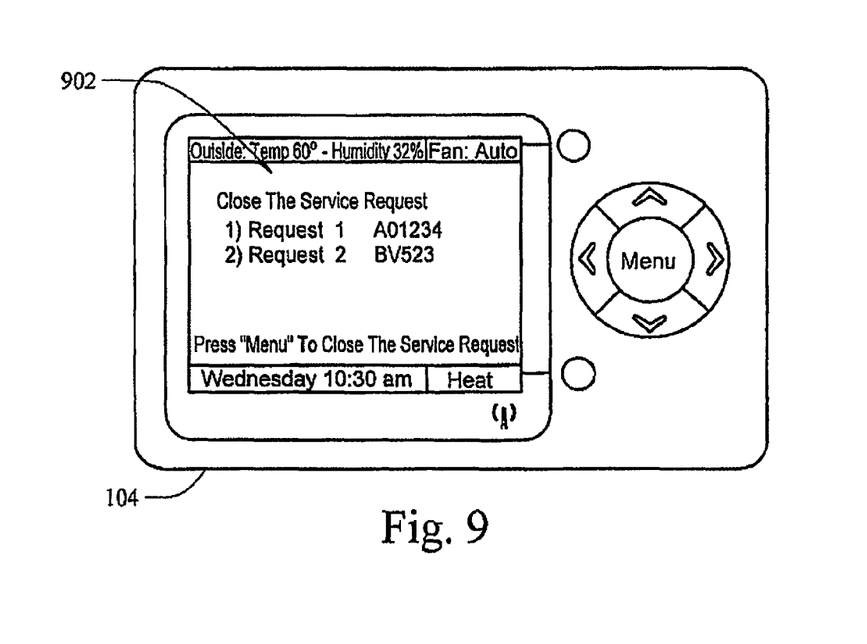
FIG. 9 illustrates display of plurality of active service requests to be closed, in accordance with the present invention.
Figure 9A:
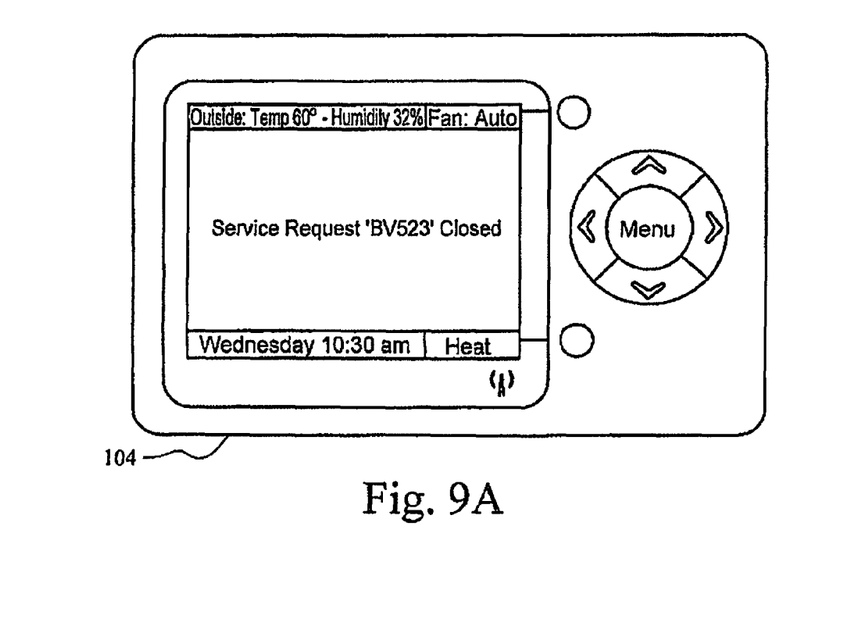
FIG. 9A illustrates display confirmation of closure of the service request selected in FIG. 9, in accordance with the present invention.

FIG. 9 and FIG. 9A depicts the closure of a particular service request raised by the user.

Figure 3:
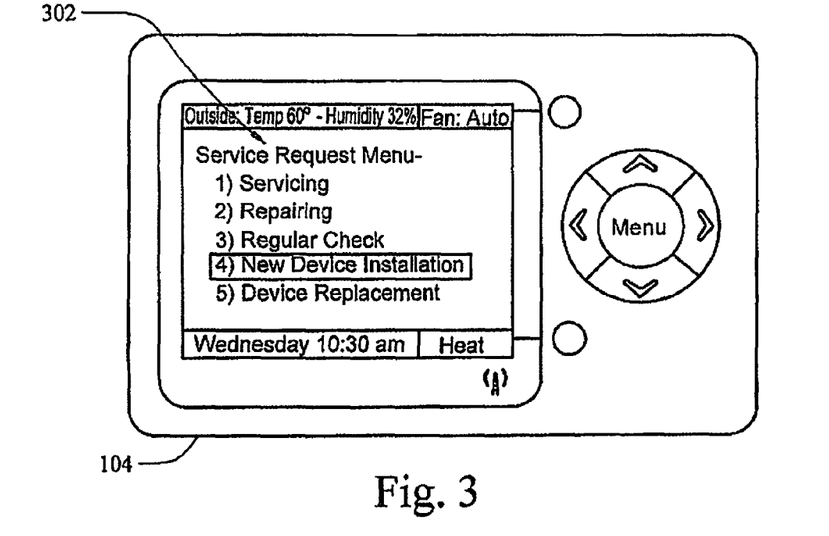
FIG. 3 illustrates functionality to select type of service, in accordance with the present invention.

Referring to the accompanying drawings, FIG. 3 depicts the customer placing a request for installation of a new device. The user interface 104 displays the type of service request 302 that can be requested by the customer.

Figure 4:
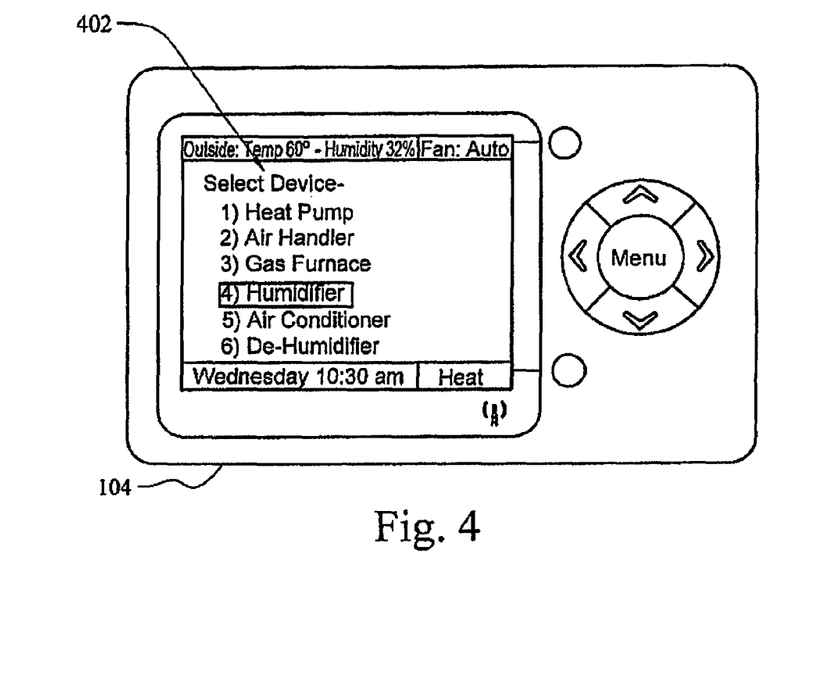
FIG. 4 illustrates functionality to select type of device that needs service action, in accordance with the present invention.

Referring to the accompanying drawings, FIG. 4 depicts the process once the 'type of service request', which is new device installation, is selected, the user interface 104 displays selection table 402 displaying all the entities that fall under the category of new installation. As an example the customer using interface 104 selects a 'Humidifier unit' to be installed.

Figure 5:
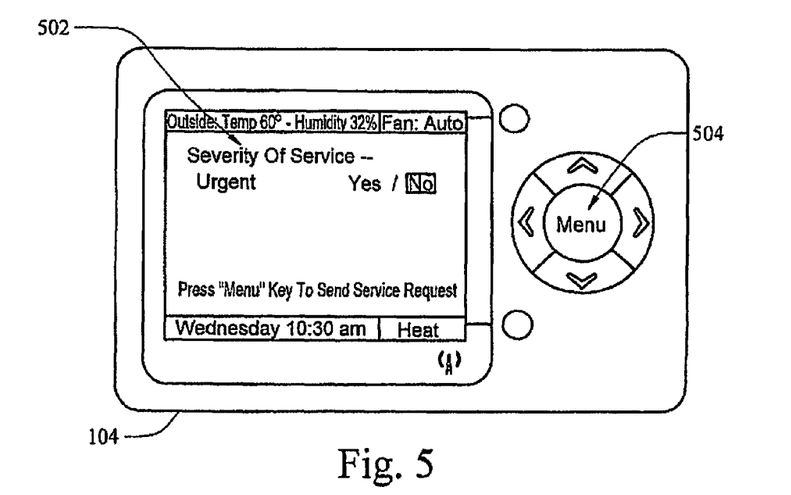
FIG. 5 illustrates functionality to assign the severity of a service request, in accordance with the present invention.

Referring to the accompanying drawings, FIG. 5 depicts the user requesting the severity 502 of his/her service request.

The customer then confirms the service request by pressing the menu key 504 and the service request is sent to the web server 110 with details of the customer.

Figure 6:
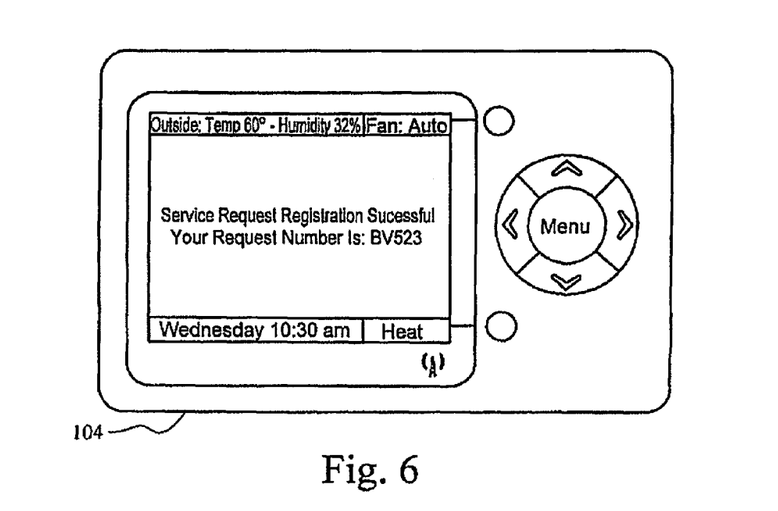
FIG. 6 illustrates display message for successful logging of said request and the service request number, in accordance with the present invention.

Referring to FIG. 6, the web server 110 acknowledges the service request by sending back a unique request registration number which is displayed on the user interface 104.

Figure 7:
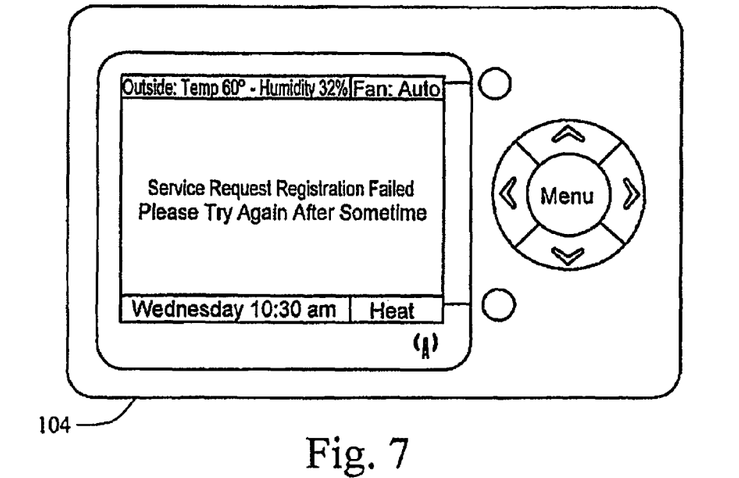
FIG. 7 illustrates display message during failure to register said service request, in accordance with the present invention.

Referring to FIG. 7, if due to some network congestion problems, or the service request is not able to be processed, then the user interface 104 notifies the customer of the failure of the registration of the service request and asks the customer to try again after sometime.

For a successfully registered service request, the web server 110 immediately notifies the contractor, along with the details, for particular customer that needs a service. The customer information is displayed on the display means of the contractor.

The contractor after reception of service requests serves customers depending on the urgency of that particular customer.

Once the contractor has received information on devices/equipments that are present at customer's location, he/she selects humidifiers compatible with the customer's HVAC network. This makes the whole process effortless and swift.

In accordance with the present disclosure, once the service request is executed and the issue is resolved, the user can close the service request.

Figure 8:
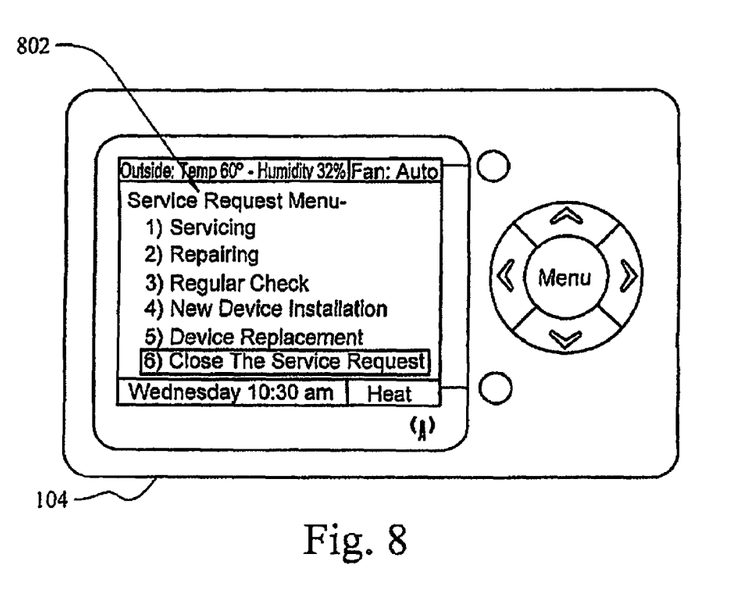
FIG. 8 illustrates functionality to close a service request, in accordance with the present invention.

Referring to FIG. 8, the "Close The Service Request" option from the Service Menu request 802 can be selected to close the service request. This is facilitated through the user interface 104.

Referring to FIG. 9, after choosing to close the service request, the user interface 104 displays all active service requests 902 and user has to choose a service request to close.

Referring to FIG. 9A, once a particular service request has been chosen by the user as mentioned in FIG. 9, the confirmation of service request closure is displayed.

If the service closure request fails, the thermostat automatically attempts at regular intervals to close the service request at web server's end.

Figure 10:
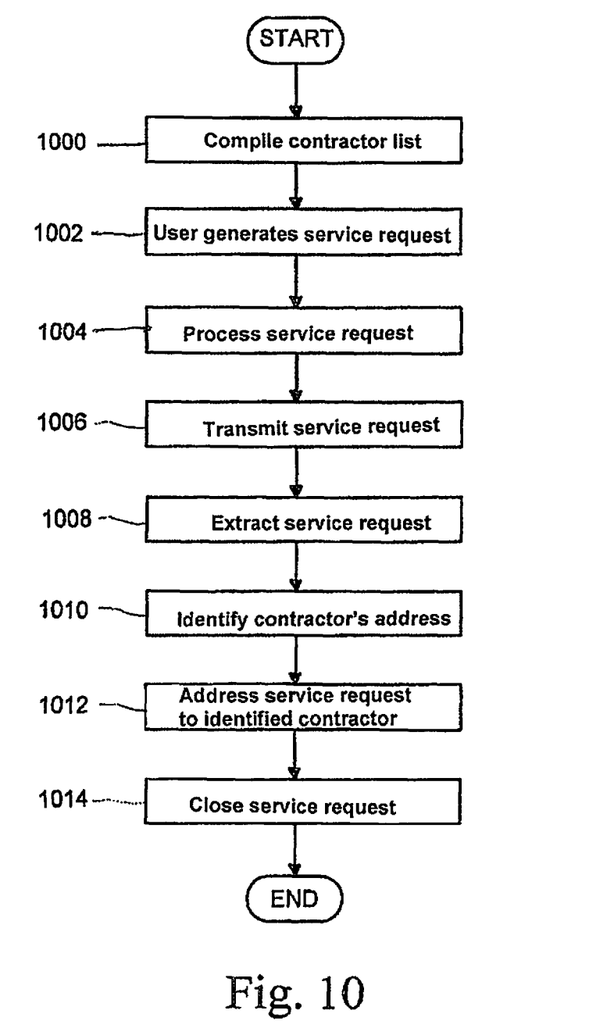
FIG. 10 illustrates the flow diagram for an Internet based detailed service notification, in accordance with the present invention.

Referring to the accompanying drawings, FIG. 10 depicts a method for Internet based service notification system, the method comprising of following steps:
  a. compiling a list of contractors for servicing HVAC devices 1000;
  b. generation of service request by the user 1002;
  c. processing the service request by stamping a unique identification number 1004;
  d. transmitting said service request over the Internet to a web-based server 1006;
  e. extracting said transmitted service request 1008;
  f. identifying contractor's address from the entries in the web-server 1010;
  g. addressing service request and request details to identified contractor 1012; and
  h. closure of said service request by the contractor/service person/user after completion of service request 1014.

TECHNICAL ADVANCEMENTS

The technical advancements of the present invention include:
  providing a method for an electronic and automated format of raising a service request query;
  providing a system wherein the customer does not have to remember the contact details of the servicing contractor;
  providing a system wherein the customer is assured that the contractor servicing or repairing his/her system is a reliable and representative of the thermostat company;
  providing a system wherein the process of registering a service request/call for repair/service becomes an effortless and swift;
  providing a new business segment for a thermostat company;
  providing a system wherein the servicing contractor has prior knowledge of the severity of the service request and so he/she can choose customer depending on severity;
  providing a system wherein the contractor can service a customer better;
  providing a means to retain existing customers;
  providing a method of efficient servicing; and
  providing a closed loop process for a service request which ensures that the service call is executed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method comprising the following steps:
  storing on a web-based server a list of contractors for servicing climate control system devices, and associating a plurality of Heating Ventilation and Air Conditioning HVAC devices with one or more of the contractors based on contractor competency to service the HVAC devices, the storing and associating performed by an Internet-based system that includes the web-based server and a HVAC system thermostat unit that controls comfort parameters for operation of the HVAC devices, where the Internet-based system is configured to provide service requests to the contractors;
  receiving a service request made by a user of the thermostat unit, the thermostat unit having a unique identification number associated by the Internet-based system individually with each of the HVAC devices, the receiving performed through a user interface of the thermostat unit, the user interface communicatively connected with the HVAC devices and configured to specify a problem of a specific HVAC device determined at least in part from communication with one or more of the plurality of HVAC devices;
  the thermostat unit processing the service request by assigning it with the thermostat unique identification number and a device identifier for a specific one of the HVAC devices indicated in the service request as being in need of servicing;

the thermostat unit transmitting said service request including the thermostat unique identification number and identifier of the specific HVAC device over the Internet to the web-based server;

the web-based server receiving said transmitted service request from the thermostat unit, extracting said thermostat unique identification number from said transmitted service request, identifying a contractor from the list based on the device identifier, and sending said service request and said unique identification number to the identified contractor; and the thermostat unit closing said service request after completion of the service request.

2. The method as claimed in claim 1, wherein the service request includes a request for one or more of the following: repair, regular check-up, new device installation and device replacement.

3. The method as claimed in claim 1, further comprising assigning urgency to the service request.

4. The method as claimed in claim 1, further comprising displaying a status of the service request on said user interface.

5. The method as claimed in claim 1, wherein identifying a contractor from the list comprises identifying the contractor based on proximity of the contractor's address to the device indicated in the service request as being in need of service.

6. The method as claimed in claim 1, wherein the method provides a closed loop process for the service request.

7. A system for providing servicing of Heating Ventilation and Air Conditioning (HVAC) systems, the system comprising:

a thermostat, in a HVAC system connected with each of a plurality of HVAC devices of the HVAC system and that regulates comfort parameters for operation of the plurality of HVAC devices of the HVAC system, the thermostat having a user interface communicatively connected with the HVAC devices and that receives user input via a menu presented for a particular one of the HVAC devices, and in response to the user input, outputs a service request for the particular one of the HVAC devices, the service request specifying a problem of the particular HVAC device determined at least in part from communication with the HVAC devices; and a web-based server having one or more processors and memory programmed to:

receive the service request via the Internet from the thermostat;

identify the thermostat from which the service request is received and identify the particular HVAC device, the identifying based on a unique identifier of the thermostat and an identifier of the particular HVAC device included in the service request, where each of the HVAC devices has an identifier associated with the unique identifier of the thermostat on the web-based server;

based on the identifying and on a particular servicing need of the particular HVAC device, select one of one or more contractors predetermined to be technically competent to service the particular HVAC device and associated by the web-based server with the particular HVAC device; and send the service request and said unique identifier to the selected contractor.

8. The system as claimed in claim 7, wherein the thermostat is configured to receive input from the user to close the service request.

9. The system as claimed in claim 7, wherein the web server is further configured to maintain a servicing history of the HVAC system and to send at least a portion of the history to the selected contractor in relation to the service request.

10. The system as claimed in claim 7, wherein the web server is further configured to send to the selected contractor information identifying the user of the HVAC system.

11. An Internet based system comprising:

a thermostat unit that, when installed in a Heating Ventilation and Air Conditioning (HVAC) system, controls comfort parameters for operation of a plurality of HVAC devices of the HVAC system, the thermostat unit having a unique identification number associated by an Internet-based system individually with each of the HVAC devices, where the Internet-based system is for providing service requests to a predetermined group of service contractors, the thermostat unit comprising:

a user interface configured in the thermostat unit for receiving a service request from a user requesting service as to a specific one of the HVAC devices, the user interface being communicatively connected with the HVAC devices, the service request identifying the specific HVAC device and specifying a problem of the specific HVAC device determined at least in part from communication with one or more of the plurality of HVAC devices;

a processor and memory programmed to receive and process said service request by assigning said service request with said unique identification number and with an identifier of the specific HVAC device to generate a unique service request; and a transmitter configured in the thermostat unit for receiving said unique service request from the processor and transmitting said unique service request including said unique identification number and the identifier of the specific HVAC device over the Internet;

the Internet based system further comprising a web-based server comprising:

a memory storing a look up table in which said unique identification number of the thermostat unit is associated with (a) the HVAC devices each having identifiers in the look up table, each HVAC device identifier associating the identified HVAC device with one or more contractors predetermined to be technically competent to service the identified HVAC device, and (b) at least one contractor's address;

one or more processors configured to receive said transmitted service request from the thermostat unit, extract said unique identification number from said transmitted service request, and select a contractor's address from entries in the look up table for one of the one or more contractors associated with the specific HVAC device;

the web-based server communicatively connected with one or more networks wherein the web-based server sends said service request and said unique identification number to the contractor having the selected address.

12. The system as claimed in claim 11, wherein said user interface is configured in the thermostat unit to provide a service request menu navigable by a user to specify a problem with the specific one of the one or more HVAC devices.

13. The system as claimed in claim 11, wherein said user interface includes at least one interface selected from the group of interfaces consisting of a button, scroll, touch screen, switch and keypad.

14. The system as claimed in claim 11, wherein said user interface is configured in the thermostat unit to display the status of said service request.

15. The system as claimed in claim 11, wherein said user interface is configured in the thermostat unit to receive user input to close a service request.

16. The system as claimed in claim 11, wherein said service request includes at least one service selected from the group of services consisting of repair, regular check-up, new device installation and device replacement.

17. The system as claimed in claim 11, wherein said service request is assigned an urgency level.

18. The system as claimed in claim 11, wherein said web-based server sends the service request through the one or more networks via one or more of the following: SMS, email, automatically generated call, VoIP and FAX.

* * * * *